US009969507B2

(12) United States Patent
Iannone

(10) Patent No.: US 9,969,507 B2
(45) Date of Patent: May 15, 2018

(54) METHOD FOR PERFORMING DIAGNOSTICS OF A STRUCTURE SUBJECT TO LOADS AND SYSTEM FOR IMPLEMENTING SAID METHOD

(71) Applicant: ALENIA AERMACCHI S.p.A., Venegono Superiore, Varese (IT)

(72) Inventor: Michele Iannone, Napoli (IT)

(73) Assignee: ALENIA AERMACCHI S.p.A., Venegono Superiore, Varese (IT)

( * ) Notice: Subject to any disclaimer, the term of this patent is extended or adjusted under 35 U.S.C. 154(b) by 700 days.

(21) Appl. No.: 13/933,964

(22) Filed: Jul. 2, 2013

(65) Prior Publication Data

US 2014/0012461 A1    Jan. 9, 2014

(30) Foreign Application Priority Data

Jul. 4, 2012    (IT) .............................. TO2012A0588

(51) Int. Cl.
*G06N 3/08*    (2006.01)
*B64F 5/00*    (2017.01)
*G05B 23/02*    (2006.01)

(52) U.S. Cl.
CPC .............. *B64F 5/00* (2013.01); *G05B 23/024* (2013.01); *G06N 3/08* (2013.01)

(58) Field of Classification Search
CPC ......... F02D 41/22; F02D 41/222; G06N 3/08; G06N 5/022
See application file for complete search history.

(56) References Cited

U.S. PATENT DOCUMENTS 5,774,376 A * 6/1998 Manning ............. E02B 17/0034
  702/56
6,480,792 B1 * 11/2002 Prendergast ............. G07C 3/00
  702/42

(Continued)

FOREIGN PATENT DOCUMENTS

WO    WO 2010/064216 A1    6/2010

OTHER PUBLICATIONS

Italian Search Report for corresponding Italian Patent Application No. TO2012A000588 dated Mar. 21, 2013.

(Continued)

*Primary Examiner* — Thomas G Black
*Assistant Examiner* — Demetra R Smith-Stewart
(74) *Attorney, Agent, or Firm* — Merchant & Gould P.C.

(57) ABSTRACT

A method for performing diagnostics of a structure subject to loads, in particular an aircraft structure, is implemented by an arrangement of sensors located at relevant points of the structure and corresponding neural networks. The method includes training the neural network in order to establish an associative relationship between the state of the structure in a subset of relevant points and the state of the structure in at least one residual relevant point. The state of the structure is detected in a plurality of relevant points under operating conditions. The state of the structure is estimated in at least one residual relevant point by the associated neural network on the basis of the pre-established associated relationship. The state of the estimated structure is compared with the detected state at the residual relevant point, such that an intact state of the structure is determined if the expected and detected values of the state parameter match, or a defective state of the structure is determined if these values differ.

14 Claims, 4 Drawing Sheets

(56) References Cited

U.S. PATENT DOCUMENTS

| | | | | |
|---|---|---|---|---|
| 7,286,964 | B2* | 10/2007 | Kim | G01H 9/004 340/870.15 |
| 7,596,470 | B2* | 9/2009 | Kim | G01H 9/004 340/870.15 |
| 7,822,697 | B2* | 10/2010 | Sobhani Tehrani et al. | 706/21 |
| 2007/0260425 | A1* | 11/2007 | Kim | G01H 9/004 702/182 |
| 2011/0231037 | A1* | 9/2011 | Stiharu | B64C 25/00 701/16 |
| 2011/0313726 | A1 | 12/2011 | Parthasarathy et al. | |
| 2013/0238532 | A1* | 9/2013 | Kearns et al. | 706/12 |
| 2016/0091388 | A1* | 3/2016 | De Baere | G01M 5/0033 73/40 |

OTHER PUBLICATIONS

Nakamura, M. et al. "A method for non-parametric damage detection through the use of neural networks", Earthquake Engineering & Structural Dynamics, vol. 27, No. 9, Sep. 1, 1998, pp. 997-1010.

Jiang, X. "Recent Development in Structural Damage Diagnosis and Prognosis", Recent Patents on Engineering, Jun. 1, 2010, pp. 102-121.

Xu, B. et al. "Direct identification of structural parameters from dynamic responses with neural networks", Engineering Applications of Artificial Intelligence, Pineridge Press, Swansea, GB, vol. 17, No. 8, Dec. 1, 2004, pp. 931-943.

* cited by examiner

METHOD FOR PERFORMING DIAGNOSTICS OF A STRUCTURE SUBJECT TO LOADS AND SYSTEM FOR IMPLEMENTING SAID METHOD

This application claims benefit of Serial No. TO2012A000588, filed 4 Jul. 2012 in Italy and which application is incorporated herein by reference. To the extent appropriate, a claim of priority is made to each of the above disclosed applications.

FIELD OF THE INVENTION

The present invention relates in general to a method for performing structural diagnostics, and more specifically to a method for performing diagnostics of a mechanical structure, in particular an aircraft structure, adapted to evaluate or monitor the presence of damage or defects caused in a structure by operating loads and/or events occurring while in service.

BACKGROUND OF THE INVENTION

In methods for carrying out the maintenance of systems (parts of products or complex products) it is of particular interest to be able to reduce unexpected faults by monitoring certain parameters indicating the state of the system.

According to the prior art, in the aeronautical sector the presence of damage or defects in a mechanical structure of an aircraft, such as a metal or composite structure, for example fuselage or wing structure, is diagnosed indirectly by means of a historical reconstruction of events, including events which have resulted in damage due to an accidental impact during production (impact of a tool) or while in service (impact due to hail or foreign objects), and loads withstood by the structure, or by means of estimate of the fatigue withstood by the structure, based on the knowledge of its mechanical strength properties in response to the stresses which typically occur in service conditions. In particular, in the case of composite structures, accidental impacts produce effects which are not very visible externally, but may cause considerable damage inside the structure (for example, delamination).

This technique, however, is laborious and imprecise, because it does not reflect in real time the changes and the physical and mechanical conditions of the monitored structure.

A method for predicting the behaviour of a structure subject to loads was developed by the same Applicant and described in the European patent application EP 2,281,224 A1. The method comprises the provision of a mathematical model of the structure, detection of the state (deformation) of the structure in a plurality of primary points and in a plurality of additional points, determination of the loads acting on the structure and associated with the state detected in the primary points on the basis of the aforementioned mathematical model, estimation, using the loads determined, of the state of the structure in the additional points, and comparison between the state of the structure estimated and that detected in the additional points, so that an intact state of the structure is determined if the estimated and detected values of the state parameter match, or a defective state of the structure if these values differ.

SUMMARY OF THE INVENTION

The object of the present invention is to provide an improved method for performing structural diagnostics, which is both simple and flexible and allows the physical and mechanical conditions of a structure to be estimated with continuity in a reliable manner.

A further object of the invention is to provide a method for performing diagnostics which can be applied without the need for excessive calculation and in particular without the need to create a physical/mathematical model of the structure and which can therefore be implemented on-board an aircraft also when in service or during a mission.

Particular embodiments form the subject of the dependent claims, the contents of which are to be understood as forming an integral or complementary part of the present description.

The invention also relates to a system and a computer program for performing the diagnostics of a mechanical structure.

In short, the present invention is based on the characterization of a mechanical structure being examined which is subject to operating loads able to cause local deformation thereof (or modify another parameter indicative of its state) and on the correlation in real time of real deformation data (or more generally data indicative of the real variation of the prechosen state parameter) and presumed deformation data (or more generally presumed variation of the prechosen state parameter), a comparison thereof being used to deduce the intact or defective condition of the structure.

A defect of the structure may consist of a hole, a filled hole or other modifications to the surface or volume, for example caused by the insertion of a connection member, impact damage, delamination, porosity, or due to a zone of the structure which has a different resin or fibre intensity. A defect may be concentrated in a point with specific coordinates or spread out in a direction or over an area or within a volume of the structure.

In a currently preferred embodiment, the structure being examined is equipped with a limited number of deformation sensors located in relevant points.

It should be noted that, depending on the prechosen arrangement of relevant points (or detection points) on the structure a possible concentrated defect, located far from them, may not cause any variation in the state of the structure at the relevant points, so that a given load or load vector gives rise to a deformation vector which is unchanged in the presence of a defect. Obviously, the criterion for choosing the detection points must preferably take into account the sensitivity to the structural defect at said points.

A neural network, the degree of complexity of which depends on the morphological complexity of the structure, is trained on the basis of the state conditions detected on the structure at the relevant points by means of association with at least one and preferably a plurality of different load conditions. The neural network is designed to estimate a correlation between the state or the variations in state detected in a subset of relevant points and the state or the variation in state in one or more residual relevant points.

A presumed variation in state of the structure under examination at a relevant point depending on a given operating load is estimated by means of the neural network which has been suitably trained and is compared with the corresponding assumed real value of the state parameter measured by the sensor associated with the relevant point.

Advantageously, by means of the neural network, for each load situation an associative prediction of the state or modification in the state is assigned to a subset of relevant points and preferably to each relevant point of the complete set of relevant points on the basis of the state or modifications in the state detected at the other points of the set.

Therefore, for each point and any load situation a comparison may be performed between the value of the state parameter predicted by the neural network for that point and the real value of the state parameter detected by the associated sensor, basically performing a comparison between the expected state of the structure and the detected state.

The diagnostic evaluation of the structure is performed by means of identification and signalling of the points where the value assumed by the state parameter detected differs from the expected value by an amount greater than a predetermined tolerance threshold. An intact state of the structure is determined if the expected and detected values of the state parameter match within the predetermined tolerance threshold, or a defective state of the structure is determined if these values differ beyond the predetermined tolerance threshold.

The diagnostic evaluation may be conveniently verified by considering a plurality of different load situations and therefore measurements of the presumed variation of the state parameter, so that the existence of a mismatch condition between values predicted by means of the neural network and values detected by the sensors in a plurality of load situations may be interpreted as a confirmation of the presence of damage or a defect in the structure, while the existence of a mismatch condition between values predicted by means of the neural network and values detected by the sensors in a single load situation or in a small number of load situations together with the existence of a match condition between values predicted by means of the neural network and values detected by the sensors in a multiplicity of different load situations may be interpreted as an occasional signal.

Mapping of the points where the presence of damage or a defect in the structure is estimated may be interpreted as a useful indication of the extent of the damage.

Advantageously, the method according to the invention does not require the construction of a complex model of the diagnostics structure, for example finite-elements model, as described in EP 2,281,224 A1.

BRIEF DESCRIPTION OF THE DRAWINGS

Further characteristic features and advantages of the invention will be explained more clearly in the following detailed description of a non-limiting example of embodiment thereof, provided with reference to the accompanying drawings in which.

DETAILED DESCRIPTION OF A PREFERRED EMBODIMENT OF THE INVENTION

Figure 1:
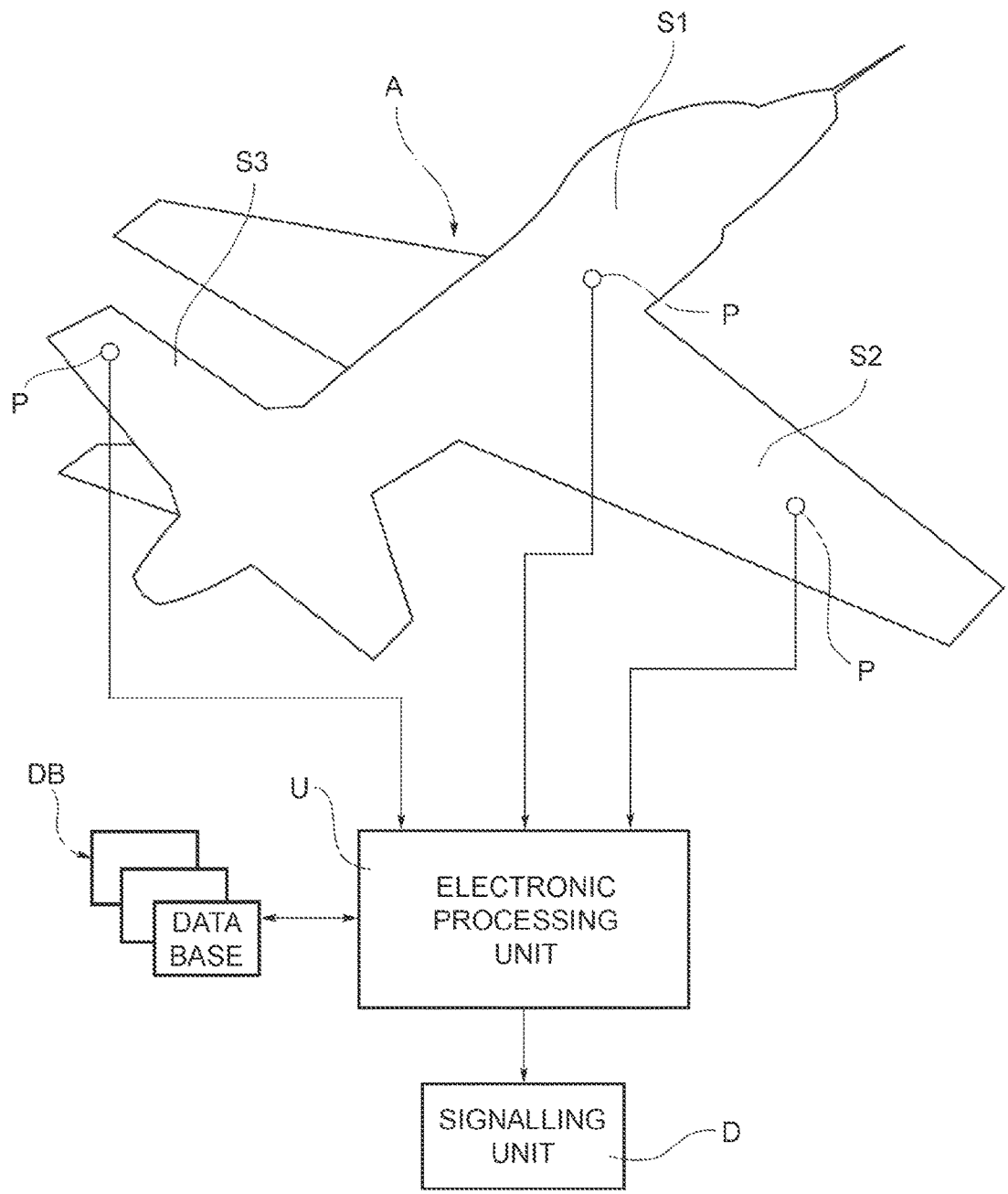
FIG. 1 shows an example of a diagnostics system according to the invention, applied to an aircraft.

An example of a structural diagnostics system in the preferred application to an aircraft is schematically shown in FIG. 1.

Said figure shows the aircraft, generally denoted with A, and some of its structural parts which are to be monitored with regard to their intact or defective condition, for example the fuselage S1, the wing structure S2 and the tail unit S3. A plurality of sensors, generally denoted with P, are shown located on each part in N relevant detection points suitable for detecting a parameter indicative of the state of the aircraft structures, for example in the description provided here the local static deformation (where applicable, in more than one direction).

The sensors are connected to an electronic processing unit U to which respective signals representing the parameters detected are transmitted. A database DB is associated with the processing unit and is designed to store a plurality of vectors comprising the values assumed by at least one predetermined state parameter detected at the N points in different load conditions. For operation of the system according to the invention, conveniently in a learning step during the first stage of operation of the diagnostics structure a large number of vectors are recorded.

The processing unit U comprises a plurality of neural networks which are designed to process data with an approach of the associative type, and the number of vectors which are conveniently recorded during a learning step depends on the number of coefficients used by the neural networks described below, and preferably this number of vectors should be at least five times the number of coefficients.

For i-th point $P_i$, where P lies between 1 and N, a neural network is designed to determine a correlation between the values assumed by the state parameter in the N−1 points different from the point P, and the value assumed by the state parameter in the point $P_i$, depending on at least one and preferably a plurality of load conditions.

Figure 4:
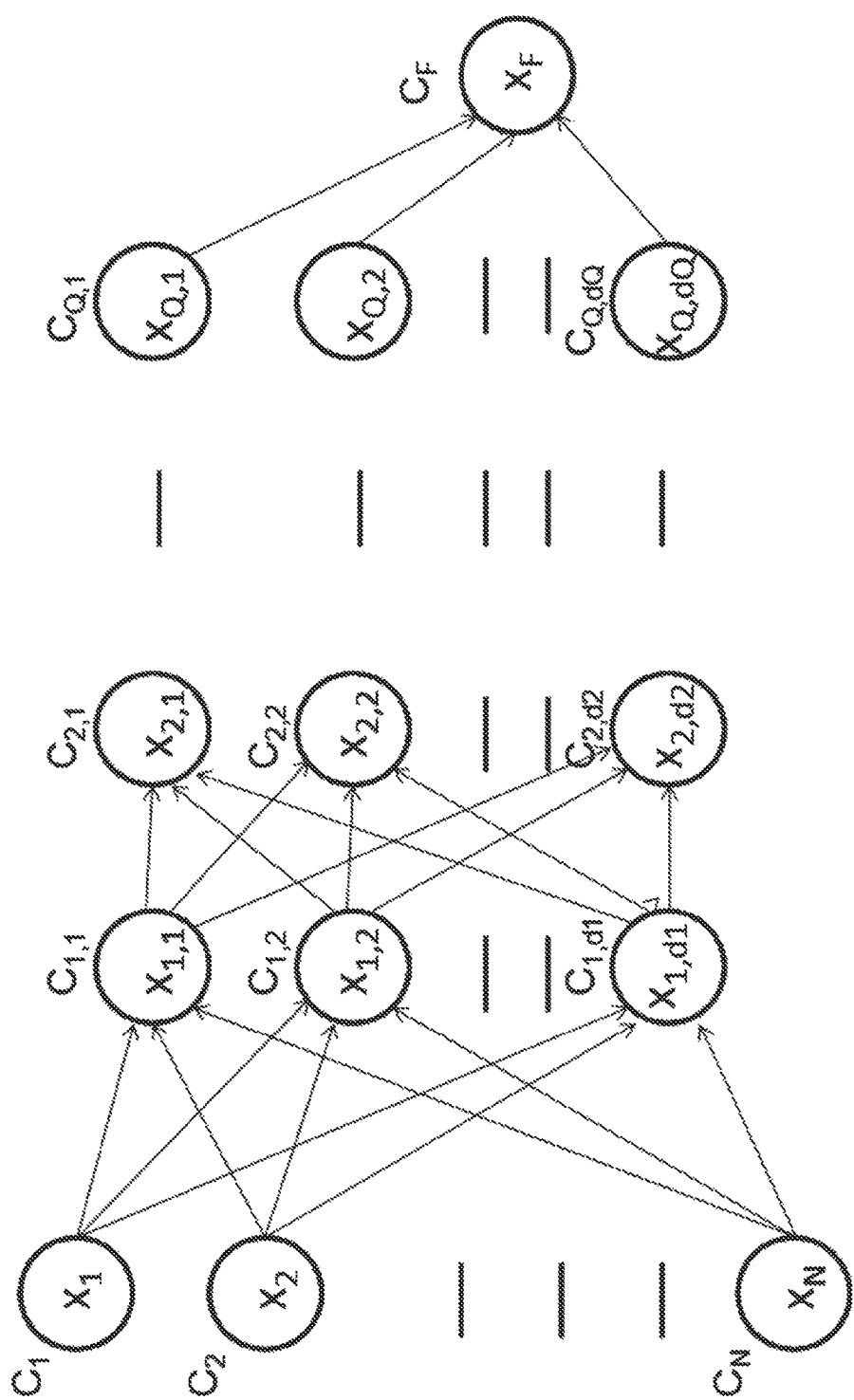
FIG. 4 is a diagram illustrating an example of a neural network according to the invention.

Each neural network is a network with Q levels, with $d_Q$ nodes per level, as shown in FIG. 4. By way of example, and with reference to the Figure, a correlation of the neural type established between N relevant points $X_1, X_2, \ldots, X_N$ at the input and a relevant point $X_F$ at the output is described.

First of all a neural box consisting of Q successive lines (for example 3), each with dimensions $d_1, d_2, \ldots, d_Q$ (for example 3 nodes per line) is established. The correlative logic flow is shown in the figure, so that each node contributes to all the nodes of the next level.

A respective correlation parameter C is defined for each relevant input point for each neuron (inner node) and for each relevant output point. A crossed correlation function ϕ is also established and associates with each pair of correlation parameters $C_a, C_b$ a crossed correlation parameter K, where $K_{a,b} = \phi(C_a, C_b)$. A function f (typically a hyperbolic function) is defined and, for each successive step, a correlation is established between the N relevant input points and the relevant output point of each calculation step indicated by $X_{i+1,j} = f((x_{i,1}, K_{(i,1),(i+1,j)}), (x_{i,2}, K_{(i,2),(i+1,j)}), \ldots, (x_{i,N}, K_{(i,N),(i+1,j)}))$.

This having been defined, training of the network, based on the availability of a sufficiently large number of real situations in which the values of the relevant points upstream of the network and the corresponding value of the relevant point downstream of the network are known, consists in defining the parameters C which minimize the difference between the output value calculated by the function f and the optimized parameters C, and its real value. Minimization may be performed, for example, using criteria of the "minimum squares" type.

By means of N neural networks which have been suitably trained, one for each relevant point, for each load situation in which the deformations in N−1 points are detected, the processing unit is able to provide an associative prediction of the value of the state parameter for the remaining point.

The processing unit is connected moreover to a signalling unit D for indicating to an operator, such as the aircraft pilot or a maintenance engineer, visually by means of written information and mapped points on a screen or electronically by means of issuing of a report, the intact or defective state of the monitored structures.

Figure 2:
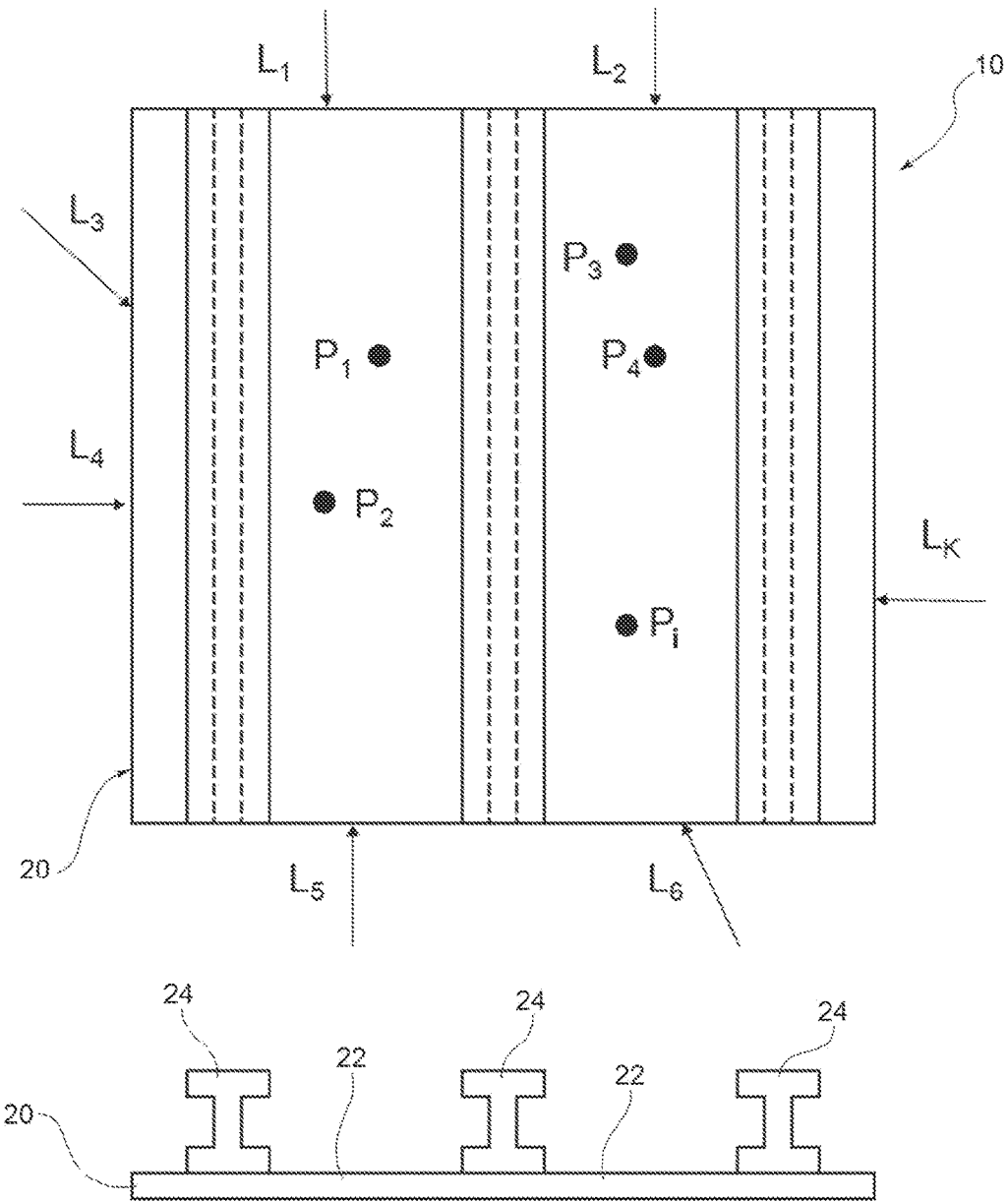
FIG. 2 shows an example of structure and a system of forces acting thereon.

An example of a structure being examined by a diagnostics system is shown in FIG. 2, in the form of a fuselage panel of an aircraft—generally denoted with 10 and shown in a top plan view and side view—which comprises a flat bottom element 20 which has on a surface 22 a series of reinforcing ribs 24.

$L_1$-$L_K$ indicate the vectors representing the forces acting on the structure (which is essentially two-dimensional) in a predetermined operating condition, by way of example and for the sake of simplicity having components only in the plane in which the structure lies.

$P_i$ denotes relevant points on the surface of the structure, which are typically chosen based on a criterion of substantial periodicity, except for any clustering in the vicinity of areas which are more critical from a structural point of view (for example, the skin/reinforcement bonding zone, in order to diagnose any possible detachment of the reinforcements).

Deformation sensors of the type known per se are located in the N detection points (or relevant points of the structure) $P_i$; these sensors may consist, for example, of surface sensors or sensors which are embedded in the structure and which are connected (electrically, optically or wirelessly) to the processing unit of the diagnostics system on-board the aircraft designed to associate the signals acquired by the sensors with deformation values of the structure.

Known sensors may be, for example, of the strain gauge type, namely with an electrical resistance signal which is variable depending on the deformation, or of the optical-fibre type with a Bragg grating in which detection of the deformation is based on reading of the wavelength which interferes with the grating, directly correlated to the deformation.

Figure 3:
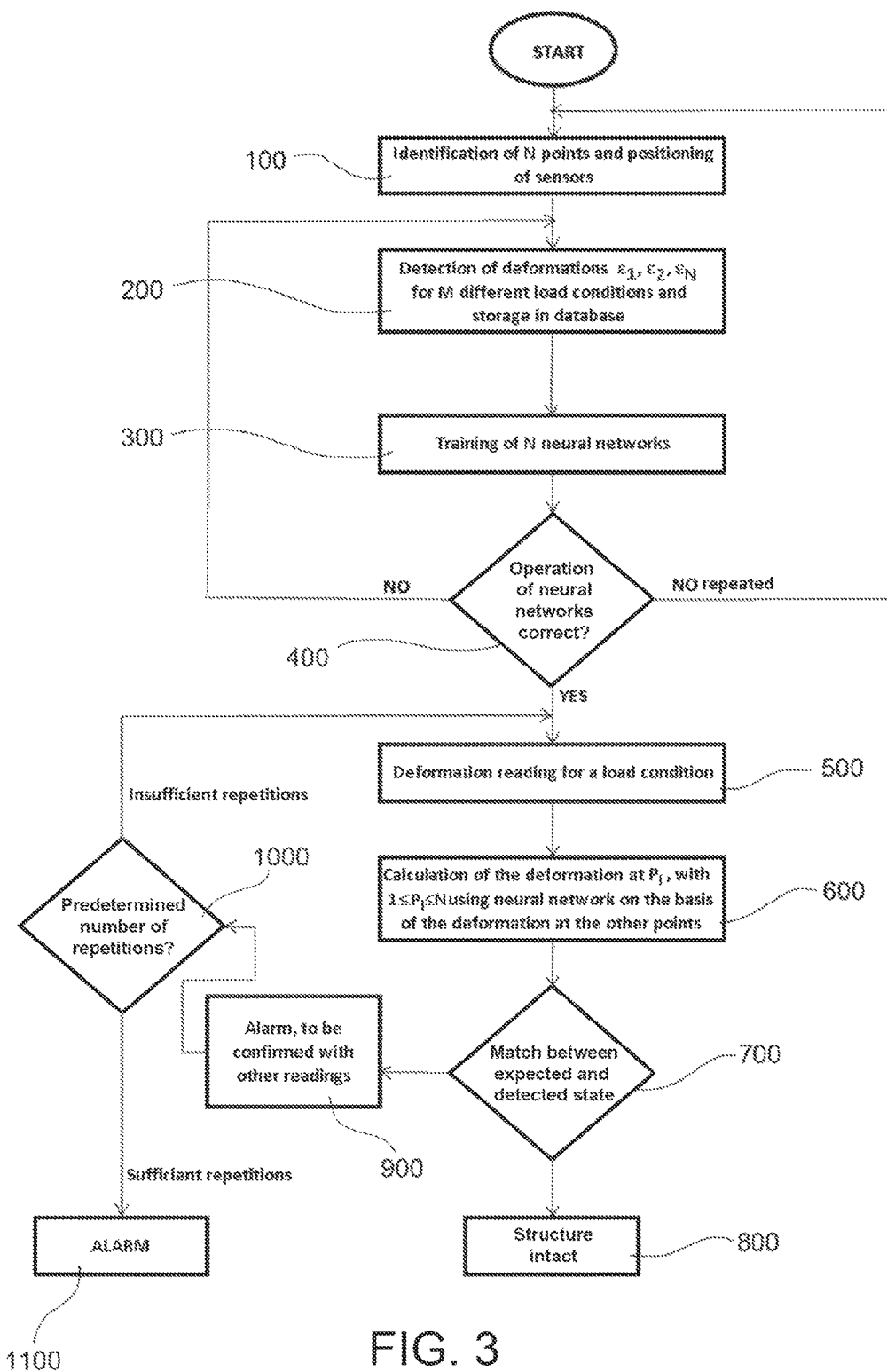
FIG. 3 is a flow diagram of the diagnostics method according to the invention.

The diagnostics method according to the invention is described in detail with reference to the flow diagram shown in FIG. 3. The diagnostics method is implemented by the on-board processing unit U designed to execute groups or modules of processing and calculation programs stored on a disk or accessible on the network, for performing the procedures described.

First of all, in step 100, the location of the relevant points on the structure is determined and the structure state sensors are positioned at these points. The sensors may be located on the structure following determination of the topology of relevant points, or vice versa, using a network of pre-existing sensors on the structure a subset (or even the entire set) of corresponding relevant points is identified on the structure.

During a first step, for example by means of same on-board processing unit, and in a definitive manner (except for system updates), M state vectors $V_{Sj}=[S_{1j}, S_{2j}, \ldots, S_{Nj}]$ are acquired in step 200 for N relevant points and M different load conditions, with $1<j<M$, which are stored in the database DB.

A state vector $V_S$ of the structure, with dimension N, is indicated as:

$$V_S=(S_1, S_2, \ldots, S_N)$$

where $S_1, \ldots, S_N$ each indicate, in abbreviated form, a value of the state parameter (in certain cases the set of three values of the components of a vectorial state parameter in a prechosen Cartesian spatial reference system) or a tupla of values of the state parameters chosen to indicate the operating condition of the structure.

The vector $V_S$ may assume theoretically infinite values, in view of the infinite nature of the loads which may act on the structure in the different possible operating conditions, or in an infinite number of pluralities of rank-N relevant points of the structure, and with a plurality of possible intensity values.

For the purposes of the invention it is considered that each element of $V_S$ may assume a finite discrete number of values, for example owing to measurement discretization of the sensors which are employed on the structure.

In the currently preferred embodiment, for each load situation the processing unit U acquires N training deformation values $[\epsilon_{1j}, \epsilon_{2j}, \epsilon_{Nj}]$, one for each relevant point $P_i$. For M different load conditions the processing unit therefore acquires M deformation vectors, each of N points. The M vectors of N points are stored in the database DB.

Then, in step 300, a step for training the N neural networks is performed (one for each relevant point), setting for the neural network associated with the i-th point $P_i$ a condition of input values equal to the values of the deformation detected in the N−1 relevant points different from $P_i$ and stored in DB, and an output value representing the value of the deformation detected in the i-th relevant point $P_i$, which is also stored in DB. Each neural network creates an association between the deformations in N−1 points and that in the relevant point $P_i$ with which it is associated, so that the processing unit has at its disposal N associative laws, of the type described above, for the value of the deformation of a point $P_i$ and each of the other N−1 points, for each value of i lying between 1 and N.

Each neural network is configured during a training step advantageously performed during the first operating step of the structure. For training purposes preferably the data of M different load conditions are used, where M may be chosen depending on the number of coefficients C used by the neural network and should conveniently be at least five times the number of coefficients C in order to achieve satisfactory training.

In the case of a plurality of load conditions a comparison may be made, for each point, between the predicted deformation obtained by means of the neural network during training using as an input value the other N−1 deformations in the new load condition, and that effectively detected at the point in this condition. With this approach it is possible to evaluate the degree of progress of training, which may be prolonged, if necessary, for further load conditions.

Advantageously, for effective training the relevant points are selected based on structural and statistical (variability) criteria.

At the end of the training procedure, operation of the neural networks may be verified in step 400 by comparing the output values envisaged by the trained network for given input values with the output values used during training, and assessing whether the difference, considered at a specific point and as an average, exceeds a fixed threshold and, in the case where incorrect operation is established (i.e. the difference exceeds, at a specific point and/or as an average, the fixed threshold of at least one or a predetermined minimum number thereof) the number of different load conditions to be used for performing detection of the state conditions in the relevant points is increased, generating new training deformation vectors $[\square_{1j}, \square_{2j}, \ldots, \square_{Nj}]$ which are stored in the database DB (step 200) and on which training of the neural networks (300) is carried out again.

In the case where the incorrect operation of at least one neural network or a predetermined minimum number of such networks is determined a number of times greater than a predetermined threshold, the topology of relevant points is modified (step 100), by means of the addition or replacement of points, and then the steps for acquiring M training deformation vectors [ε$_{1l}$, ε$_{2l}$, . . . , ε$_{N'l}$] for N' relevant points and M' different load conditions, storage thereof in the database DB and training of the N' neural networks are repeated in step 300. In the case where incorrect operation persists, in addition to prolonging the training period, it is possible to envisage modifying the number of levels and/or nodes per level of the neural network and/or modifying the function (function type) f and φ.

If correct operation of the neural networks is established, the processing unit is configured to perform diagnostics of the structure, subject to any (for example periodic) updating of the deformation vectors, and corresponding new training of the neural networks, for example following modifications to the structure or ageing thereof.

The operations for performing diagnostics of the structure are described below.

Assuming that for a given load or given plurality of loads there is a distribution of deformations ε$_P$ in the grid of N relevant points P$_i$ of the structure, where 1<i<N, (ε$_P$)$_q$ indicates a distribution of deformations in the grid induced by the same load or plurality of loads in the presence of a structural defect, and more generally (ε$_P$)$_d$ indicates a distribution of deformations detected by the sensors.

At each instant, in step 500 the current state (ε$_P$)$_d$ of the structure at the relevant points for a given current load condition is detected, for example the current deformations vector [ε$_{1d}$, . . . ε$_{id}$, . . . , ε$_{Nd}$] is detected.

Then, in step 600, for each point P$_i$ with 1<i<N the value of the deformation ε'$_i$ is calculated by means of the associated neural network previously trained, using inputs including the deformation values detected in the other points (ε$_{1d}$, . . . ε$_{(i-1)d}$, ε$_{(i+1)d}$, . . . , ε$_{Nd}$).

Thereafter, in step 700, for each point and any load situation a comparison is carried out between the value of the state parameter predicted by the neural network and the value of the state parameter detected by the sensor. Specifically, the comparison between the value of the deformation ε$_{id}$ detected at the point P$_i$ and the value of the deformation ε'$_i$ calculated by the respective neural network in the same point is performed, repeating the comparison for each i, where 1<i<N.

An effective diagnostics evaluation is therefore performed by means of the comparison, at each point, between the expected structure state and the detected structure state. Identification of defects in the structure is performed for those points where the detected structure state differs from the expected state calculated by means of the respective neural network (namely there is a mismatch) beyond a predetermined percentage threshold.

If the outcome of the comparison is the recognition of a condition where there is a substantial match of the values, taking into account a predetermined tolerance, the diagnostics method concludes that the structure is intact (800), signalling this condition by means of a signalling unit D to an operator, such as the aircraft pilot or a maintenance engineer, visually by means of written information and mapped points on a screen or electronically by means of issuing of a report, so as to indicate the intact state of the structure monitored.

If the outcome of the comparison is the recognition of a condition where there is a substantial mismatch between the values, exceeding a predetermined tolerance, the diagnostics method interprets a possible defective condition of the structure (900). Consequently, the method repeats the step 500 for detecting the state of the structure in the relevant points selected, during a successive instant, for the current load condition. It then repeats the step 600 for each point P$_i$, where 1<i<N, calculating the value of the state parameter by means of the associated neural network previously trained and, finally, again in step 700, the comparison between the value of the state parameter detected at the point P$_1$ and the value of the state parameter calculated by the neural network at the same point, for each i, where 1<i<N, is performed.

The cycle of operations in steps 500-700 is repeated a predetermined number of times, checking whether a predetermined number of repetitions in the comparison step 1000 have been reached, unless a condition where there is substantial match between the values, and therefore an intact condition of the structure, is definitively recognized.

If in the comparison step 1000 it is determined that the predetermined number of repetitions has been reached and the indication of a defective state of the structure remains, a signal (1100) is emitted, by means of the signalling unit D, to an operator, such as the aircraft pilot or a maintenance engineer, visually in the form of written information and mapped points on a screen or electronically by means of issuing of a report, so as to indicate the defective state of the monitored structure and its location (namely, identification of the point P$_i$ where there is no match between the value of the state parameter detected and the value of this parameter calculated by the neural network).

The diagnostics evaluation may be further verified by considering different load situations and therefore measurements of the structure state: if the mismatch is repeated for different load conditions, this may be interpreted as a confirmation of the presence of damage or a defect in the structure which induces a variation in state. If the mismatch is not repeated, this may be interpreted as being an occasional or spurious signal, not caused by real physical factors.

The diagnostics evaluation described above is performed for each relevant point of the structure. Mapping of the points where the presence of damage or a defect in the structure is determined provides an indication of the extent of the damage. For example, determination of damage or a defect in various adjacent points is an indication of a delaminated area.

Obviously, as will be clear to a person skilled in the art, the method concluded as illustrated in the flow diagram shown in the figure may be cyclically repeated, for example at predetermined periodic intervals in accordance with a predetermined monitoring program.

Advantageously, in order to allow operation of the system also in the case of damage to the structure in the vicinity of some of the detection points, i.e. where there is damage to the sensors, a surplus is created by increasing the number of relevant detection points so as to have a certain number of additional backup sensors.

Obviously, without affecting the principle of the invention, the embodiments and the constructional details may be greatly modified with respect to that described and illustrated purely by way of a non-limiting example, without thereby departing from the scope of the invention as defined in the accompanying claims.

The invention claimed is:

1. System for performing diagnostics of an aircraft structure subject to loads, comprising:
   a sensor arrangement associated with said structure and designed to detect at least one state of the structure and which comprises a matrix of sensors located in relevant points of the structure and each of which is capable of detecting a physical parameter indicative of the local state of the structure and of emitting a respective electrical response signal correlated to the value assumed by said parameter; and electronic processing means of the neural network type, configured for:

in a learning step:

(a) based on a plurality of training data indicative of a state of the structure at a plurality of relevant detection points by association with at least one load condition, establishing an associative relationship between the values assumed by said parameter indicative of the state of the structure in a subset of said plurality of relevant detection points and the values of the state parameter in at least a residual relevant detection point; and in an operating step:

(b) detecting the values assumed by said parameter indicative of the state of the structure in a plurality of relevant detection points in said at least one load condition;

(c) based on the pre-established associative relationship, using the values assumed by said parameter indicative of the state of the structure in a subset of said plurality of detection points, estimating the values of the state parameter in at least one residual detection point;

(d) comparing the estimated values and the detected values of the state parameter in said at least one residual detection point; and (e) determining an intact state of the structure if the detected and the estimated values of the state parameter substantially match, taking into consideration predetermined tolerances, or determining a defective state of the structure if said values of the state parameter differ, taking into consideration the predetermined tolerances;

wherein said electronic processing means comprise a plurality of neural networks respectively associated with said relevant detection points, wherein each neural network is a network with Q levels, with $d_Q$ nodes per level, for each node a respective correlation parameter C being defined, a crossed correlation function $\phi$ associating a crossed correlation parameter K with each pair of correlation parameters $C_a$, $C_b$, with $K_{a,b}=\phi(C_a, C_b)$, a hyperbolic function f determining a correlation between each node of a level $X_{i+1,j}$ and the nodes of the preceding level $X_{i,j}$ as a function of said crossed correlation parameter, as:

$$X_{i+1,j}=f((x_{i,1},K_{(i,1)(i+1,j)}),(x_{i,2},K_{(i,2)(i+1,j)}),\ldots,(x_{i,N},K_{(i,N),(i+1,j)}),$$

the training of the network including determining the parameters C that minimize the difference between the calculated output value and its actual value.

2. The system according to claim 1, wherein said processing means are connected to a signalling unit for indicating to an operator the defective or intact state of the monitored structures.

3. The system according to claim 1, wherein said detection sensors include sensors for detecting deformation of the structure.

4. The system according to claim 1, wherein said electronic processing means are configured for carrying out the comparison between the estimated and the detected values of the state parameter for each relevant detection point.

5. The system according to claim 1, wherein said electronic processing means are configured for carrying out said learning step and said operating step in a plurality of different load conditions, whereby a defective state of the structure is determined when a condition of mismatch exists between the estimated and detected values of the state parameter in a plurality of load conditions, while occasional signalling occurs when a condition of mismatch exists between the estimated and detected values of the state parameter in only one load condition or in a plurality of conditions where a load less is than a threshold.

6. The system according to claim 1, wherein said electronic processing means are configured for, in the learning step, collecting a plurality of training data in the form of vectors comprising the values assumed by at least one predetermined state parameter detected in the relevant detection points, in at least one load condition.

7. The system according to claim 1, wherein said electronic processing means are configured for, in the learning step and for each neural network, determining an associative relationship between the values assumed by said parameter indicative of the state of the structure in at least one load condition in the relevant detection point corresponding to said network and the values assumed by the state parameter in the remaining plurality of relevant detection points.

8. The system according to claim 7, wherein said electronic processing means are configured for, in the learning step, and in the case of a plurality of load conditions, comparing the value of the state parameter estimated by the neural network during training in at least one relevant detection point with the value assumed by the state parameter in said at least one relevant detection point, in a new load condition.

9. The system according to claim 8, wherein said electronic processing means are configured for monitoring learning of the neural networks by a comparison between the value of the state parameter, estimated in at least one residual relevant detection point based on training data indicative of the state of the structure for a subset of said plurality of relevant detection points, and the value of the training state parameter in said residual relevant point, the learning being regarded as completed if the difference between the values is less than a predefined threshold, or otherwise unsatisfactory, the number of different load conditions in which the learning step is carried out is increased, or the topology of the relevant points is modified, or else at least one from among the number of levels, the number of nodes per level and a characteristic function of the neural networks is modified.

10. The system according to claim 1, wherein said electronic processing means are configured for determining a defective state of the structure is determined if said values of the state parameter differ, taking into consideration the predetermined tolerances, after a time sequence of a predetermined number of iterations of steps (b), (c) and (d).

11. The system according to claim 1, wherein said electronic processing means are configured for repeating steps (a), (b), (c), (d) and (e) at predetermined periodic intervals according to a pre-established monitoring plan.

12. The system according to claim 1, wherein said electronic processing means are configured for interpreting mapping of the relevant points during which the defective condition of the structure is estimated as an indication of the extent of said defective condition.

13. The system according to claim 1, wherein said parameter indicative of the state of the structure is the local deformation of the structure.

14. The system according to claim 1, wherein said relevant detection points are chosen based on a periodicity criterion, except for any clustering in the vicinity of areas of greater structural criticality.

\* \* \* \* \*